(12) United States Patent
Huyser et al.

(10) Patent No.: US 8,914,928 B2
(45) Date of Patent: Dec. 23, 2014

(54) ANGLE DETECTION AND CONTROL

(75) Inventors: Jan Huyser, Bedfordshire (GB); Simon Roff, Bedfordshire (GB); Bob Hibberdine, South Glamorgan (GB); Rhys Davies, Sosuth Glamorgan (GB)

(73) Assignee: Huntleigh Technology Limited (GB)

( * ) Notice: Subject to any disclaimer, the term of this patent is extended or adjusted under 35 U.S.C. 154(b) by 595 days.

(21) Appl. No.: 13/063,278

(22) PCT Filed: Sep. 3, 2009

(86) PCT No.: PCT/GB2009/051120
§ 371 (c)(1),
(2), (4) Date: Jun. 6, 2011

(87) PCT Pub. No.: WO2010/029338
PCT Pub. Date: Mar. 18, 2010

(65) Prior Publication Data
US 2011/0225740 A1    Sep. 22, 2011

(30) Foreign Application Priority Data

Sep. 10, 2008  (GB) ................................. 0816485.7
May 20, 2009  (GB) ................................. 0908605.9

(51) Int. Cl.
*A47C 27/08* (2006.01)
*F16K 15/04* (2006.01)
*A61G 7/057* (2006.01)
*F16K 15/20* (2006.01)

(52) U.S. Cl.
CPC ............ *F16K 15/04* (2013.01); *A61G 7/05776* (2013.01); *F16K 15/20* (2013.01); *A61G 2203/42* (2013.01)
USPC ............................ 5/713; 5/706; 5/710; 5/615

(58) Field of Classification Search
USPC .............................................................. 5/713
See application file for complete search history.

(56) References Cited

U.S. PATENT DOCUMENTS

| 4,175,263 A | 11/1979 | Triplett et al. |
| 4,195,287 A | 3/1980 | McCoy et al. |
| 4,228,426 A | 10/1980 | Roberts |

(Continued)

FOREIGN PATENT DOCUMENTS

| EP | 0168213 A2 | 1/1986 |
| GB | 2233551 A | 9/1990 |

(Continued)

*Primary Examiner* — Peter M Cuomo
*Assistant Examiner* — Brittany Wilson
(74) *Attorney, Agent, or Firm* — Craig A. Fieschko, Esq.; DeWitt Ross & Stevens S.C.

(57) ABSTRACT

An alternating pressure pad (1) comprises inflatable cells (9,10) supplied with air by supply lines (7, 8) from a compressor (2) via supply line (3). A pressure controller controls the output of the compressor. Also connected to supply line (3) is an angle detection valve (40) restricting flow of air to atmosphere with increase in its angular position and a pressure transducer (17). Any increase in pressure due to an increase in angle of the detection valve (19) results in back pressure in the detection line. The pressure controller (2) uses the pressure transducer (17) to detect this change in pressure and then acts to adjust compressor output to the cells (9, 10) accordingly. The angle detection valve (40) is positioned under the head section of the pad to move with the head rest section.

25 Claims, 13 Drawing Sheets

(56) References Cited

U.S. PATENT DOCUMENTS

| | | |
|---|---|---|
| 4,242,672 A | 12/1980 | Gault |
| 4,539,560 A | 9/1985 | Fleck et al. |
| 4,686,722 A | 8/1987 | Swart |
| 4,769,584 A | 9/1988 | Irigoyen et al. |
| 4,803,744 A | 2/1989 | Peck et al. |
| 5,003,654 A | 4/1991 | Vrzalik |
| 5,143,208 A | 9/1992 | Shostek et al. |
| 5,144,705 A | 9/1992 | Rogers |
| 5,189,745 A | 3/1993 | Workman et al. |
| 5,205,004 A | 4/1993 | Hayes et al. |
| 5,267,364 A | 12/1993 | Volk et al. |
| 5,283,735 A | 2/1994 | Gross et al. |
| 5,325,551 A | 7/1994 | Tappel et al. |
| 5,458,618 A | 10/1995 | Steinke |
| 5,498,229 A | 3/1996 | Barsky et al. |
| 5,526,543 A | 6/1996 | DiMatteo |
| 5,564,520 A * | 10/1996 | Forsythe .................. 180/282 |
| 5,586,348 A | 12/1996 | Toivio et al. |
| 5,600,108 A | 2/1997 | Newham |
| 5,611,096 A | 3/1997 | Bartlett et al. |
| 5,802,640 A | 9/1998 | Ferrand et al. |
| 6,021,800 A | 2/2000 | Schild et al. |
| 6,141,806 A * | 11/2000 | Bobey et al. .................. 5/600 |
| 6,353,950 B1 | 3/2002 | Bartlett et al. |
| 7,418,751 B1 | 9/2008 | Bartlett et al. |
| 2008/0189865 A1 | 8/2008 | Bhai |
| 2013/0276237 A1* | 10/2013 | Bobey et al. .................. 5/658 |

FOREIGN PATENT DOCUMENTS

| | | |
|---|---|---|
| GB | 2318392 A | 4/1998 |
| JP | 4325116 | 11/1992 |
| WO | WO 9822071 A1 * | 5/1998 |
| WO | WO2010029338 A2 | 3/2010 |

* cited by examiner

ANGLE DETECTION AND CONTROL

FIELD OF THE INVENTION

The present invention relates to a pressure controlled inflatable pad apparatus, in particular, a pressure controlled inflatable pressure pad apparatus.

BACKGROUND OF THE INVENTION

Alternating pressure pads are well known for the prevention and management of decubitus ulcers in bedridden patients. The formation of decubitus ulcers, commonly known as bedsores, results from, amongst other things, the pressure applied to certain portions of the skin of a bedridden patient.

Alternating pressure pads generally comprise two sets of alternately inflatable cells. A high air pressure in the pads may be needed to support the bony protuberances of a patient and to ensure that the patient is lifted sufficiently away from deflated cells of the pad so that adequate pressure relief is provided. A low air pressure, however, is desirable since it provides a pad which is softer and more comfortable. Optimal pressure support therefore not only varies from patient to patient but also during a given inflation cycle of the pad, since the pressure supporting points will change during a cycle.

The required optimal support pressure will vary even more as a patient changes from a supine to a sitting position when the bed frame is profiled to raise the head of the patient as the weight of the patient becomes more concentrated on the part of the support under the buttocks. There is a greater risk of the patient "bottoming" with the support surface contacting the surface of the bed thereby reducing the pressure relief. Bottoming can be a particular problem if the backrest is used to position the patient in a more upright or profiled position as their weight is not as evenly distributed. This applies equally to an alternating pressure pad as well as a static pressure pad.

It is known to provide a pressure controller to set an optimal pad support pressure. This may be a regulator for the compressor supplying air or a microprocessor controlling the output of the compressor to the pressure pad.

It is known to have rotational sensors in some bed frames on which the mattress is located which can derive the angle of the bed frame and therefore the mattress, and this information is then used by the pump unit to increase the mattress pressures. This however limits the sensors to only work when a mattress is connected to an expensive integrated mattress-bed frame system, and the cost of the electronics and feedback control system is likely to be very expensive. There are also commercially available incline sensors that use electronic transducers mounted on a circuit board placed in the head section of the mattress with circuitry back to the pump unit. These sensors are undesirable from a cost perspective due to the expense of the electronic board and ancillary hardware needed to read the information and then control the cells pressures. They are even more undesirable from a safety perspective as there are electronics close to the patient in an environment where fluid could well be present. There are also implications for the cleaning of the mattress with the electronics needing to be removed first.

SUMMARY OF THE INVENTION

In accordance with the present invention, a pressure controller comprises means sensitive to fluid pressure and adapted to increase or decrease the inflation pressure when said pressure exceeds a predetermined value, characterised in that said pressure is exerted by an angle detection valve variable in proportion to the angular position of the angle detection valve.

Such a pressure controller is considerably simpler and cheaper than known devices.

According to another aspect of the invention, a pressure pad system comprises inflatable sets of cells, a pump connected by a fluid supply line to supply fluid to the pad, and a pressure controller in accordance with the present invention. In such a system, the pressure controller allows pad pressure to be increased when there is insufficient support pressure due to the angular position of the pad. This simple pneumatic system provides a signal that the pump controller uses to increase the cell pressures when the pad is raised to, or beyond, a chosen angle. There are no electronics in the angle detection valve therefore making it safe to use and easy to clean. The system allows for optimal support pressure to be automatically achieved for each set of cells of the pad during the inflation period of that set of cells when the alternating pressure pad is profiled to place the patient in a more upright position. Preferably, the pressure pad comprises an alternating pressure pad of alternately inflatable sets of cells.

According to a further aspect of the present invention, a pressure pad apparatus comprises a pressure controller in accordance with the present invention, the pressure pad of inflatable sets of cells and an angle detection valve located beneath the cells, and a pump for supplying fluid to inflate the cells and to flow through the angle detection valve. Preferably, the pad comprises an alternating pressure pad of alternately inflatable sets of cells.

Preferably, the angle detection valve comprises a restrictor variable in dependence on angular position of the valve from a horizontal position.

Preferably the angle detection valve comprises a ball valve, including ball bearings in a housing arranged to restrict flow of air through the housing in proportion to the angle of the housing as the housing is inclined from a horizontal position to a vertical position.

In a preferred embodiment, the angle detection valve comprises a binary switch showing either a predetermined angular position of the valve or a horizontal position. Preferably, the angular position can be varied. Preferably, the valve comprises a housing having a ball bearing mounted on a "seesaw" arrangement arranged to stop flow of air through the housing as the housing is inclined from a horizontal position to a predetermined angular position.

BRIEF DESCRIPTION OF THE DRAWINGS

Preferred embodiments of the invention will now be described with reference to the accompanying drawings, in which.

DETAILED DESCRIPTION OF PREFERRED
VERSIONS OF THE INVENTION

Figure 1:
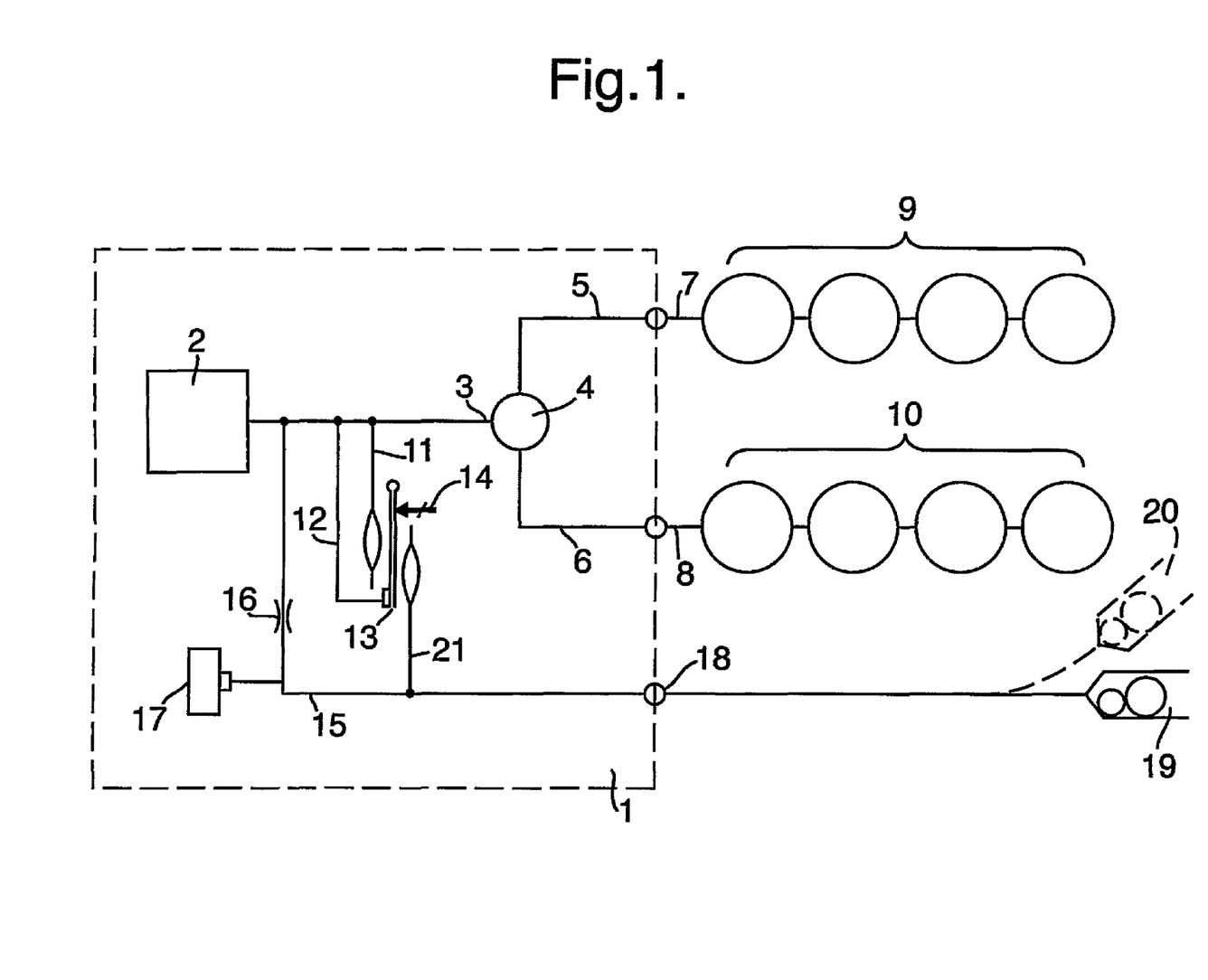
FIG. 1 is a schematic representation of a pressure controller in an alternating pressure pad system.

Referring to FIG. 1, an alternating pressure pad 1 is shown comprising a first set 9 and a second set 10 of alternately inflatable cells. Both sets of inflatable cells are supplied with air from a compressor 2 via a rotary valve 4. A pair of air supply lines 5, 6 lead from the rotary valve 4 to the pad, there being provided a further pair of air supply lines 7, 8 leading from the air supply lines 5, 6. The rotary valve 4 is supplied with air by supply line 3. Extending from the supply line 3 is a discharge line 12 with a pivotable valve plate 13. A further supply line leads to a fluid tight member 11, sensitive to, and inflatable in dependence upon, the air pressure in the associated set of cells of the pad. Inflation of the member 11 above a predetermined pressure is arranged to cause the valve plate 13 to pivot and allow air to escape through the discharge line. The valve plate is maintained in a closed position by an adjustable spring means 14 when the inflation of the inflatable members 11 is below a predetermined pressure. The inflatable members 11, the valve plate 13 and the spring 14 comprise parts of a pressure relief valve. This pressure valve maintains the pressure in the cells to predetermined pressure by venting air to atmosphere above the predetermined pressure.

Also connected to the output of the air compressor 2 is an angle detection valve 19 via a restrictor 16. The restrictor 16 allows a small percentage of air to flow through the angle detection line 15 through the angle detection valve 19 to atmosphere. A pressure transducer 17 detects the pressure in the detection line 15. A fluid tight member 21 similar to 11 is also connected to the detection line and located on the same side as the valve plate 13 as the adjustable spring means 14. The fluid tight member 21 is inflatable in dependence on the pressure in the angle detection line. Any increase in pressure due to an increase in angle of the detection valve 19 will result in the member 21 and spring means 14 urging the valve plate 13 closed against the action of the fluid tight member 11 resulting in an increase in pressure in the mattress cells. The angle detection valve 19 is positioned under the head section of the pad to move with the head rest section.

In use, the compressor 2 delivers air to a predetermined pressure under control of a pressure controller to the pad 1 via rotary valve 4 so that each set of cells of the pad is alternately inflated and deflated. The inflation/deflation cycle may repeat over periods varying from two minutes to over twenty minutes.

Figure 2:
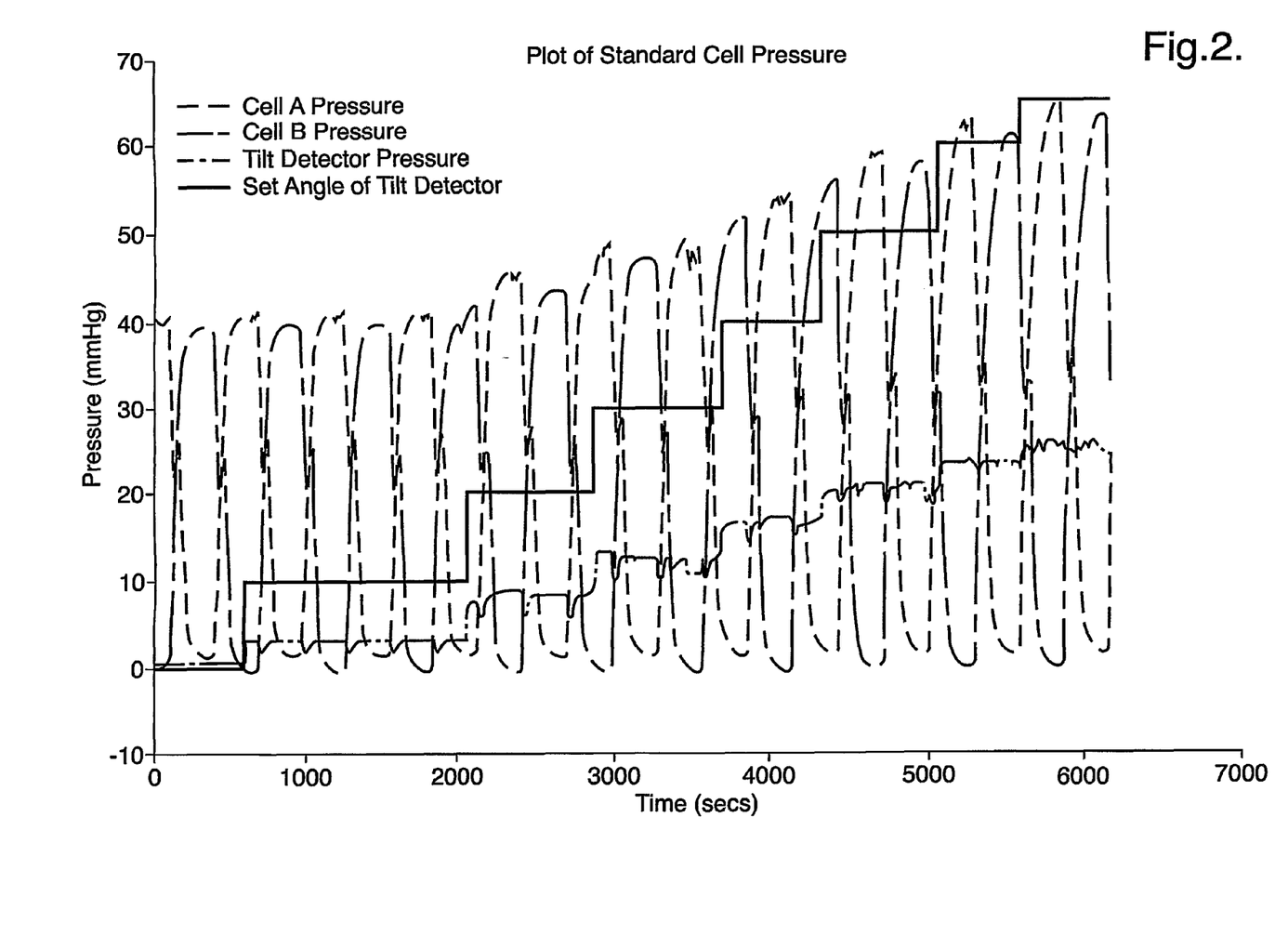
FIG. 2 shows the change in cell pressure against detection line pressures due to angular position of the angle detection valve.

The pressure relief valve, is adapted by adjusting the tension of spring means 14 so that when the air pressure in a fully inflated set of cells exceeds a predetermined pressure, valve plate 13 is opened by the inflation of the inflatable member 11. Should the angle detection valve 19 with the pad be raised to 30° causing the pressure in the angle detection line 15 to increase, the pressure in inflatable member 21 is increased thereby pushing the valve plate 13 shut. The air that was flowing out of the discharge line 15 is now diverted to the cells to inflate them to a higher pressure. FIG. 2 shows clearly how the maximum cell pressures are modified using this simple arrangement.

The pressure controller can be manual using the pressure relief valve as above or the compressor output is microprocessor controlled, as known in the art, the pressure controller adjusting the pressures inflating the cells 9, 10 in response to changes in pressure in the detection line detected by the pressure transducer 17.

The angle detection valve can be of any configuration that provides a variable restrictor in dependence on the angular position of the valve with respect to a horizontal position.

Figure 3:
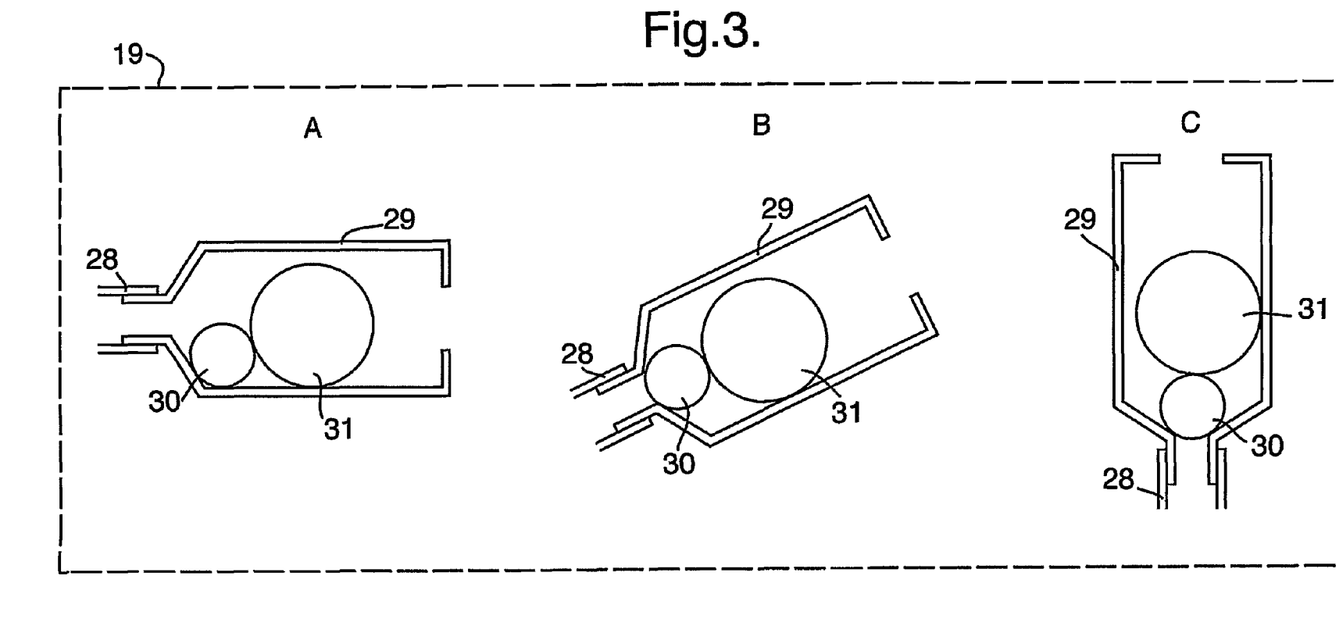
FIG. 3 is a schematic representation of a preferred embodiment of the angle detection valve.

A preferred embodiment of the angle detection valve 19 is shown in detail in FIG. 3. The valve comprises two ball bearings 30, 31 in a housing 29. In the horizontal position (A) air can flow through the angle detection line 28 and flow out to atmosphere. As the housing is tilted to 25° (B) the balls roll down the housing and cover the inflow, initially preventing air flow, but allowing some air to flow out as an equilibrium position is reached where pressure in the line and the force of the balls is balanced. The closing force of the balls is related to the resolved component of their weight along the main axis of the housing. In the horizontal position all the weight is directed downwards into the housing wall rather than towards the inflow. In the vertical position (C) all the weight of the ball bearings is acting downwards to close the inflow. For all the angles in between, a percentage of the total weight of the balls is acting to close the inflow in proportion to the angle of the housing.

The use of small and large ball bearings provides a good seal due to the small area in contact with the housing with the smaller ball, but still having the closing force of the larger ball. The maximum pressure that is generated in the angle detection line 15 is dependent on the power of the compressor and the predetermined pressure set at the pressure controller. Therefore, there may be air flowing through the tilt detection when in the vertical position, or the balls may have completely closed the valve before the vertical position has been reached. The weight of the balls will alter the ratio of angle pressure to the angle reached.

It does not matter on how tortuous the path of the tilt detection line 15 is as it is only the angle detection 19 valve at the end of the line that controls the pressure. The length of the line 15 is also not that critical as the pressures will be the same but would just take a little more time to reach.

Figure 5:
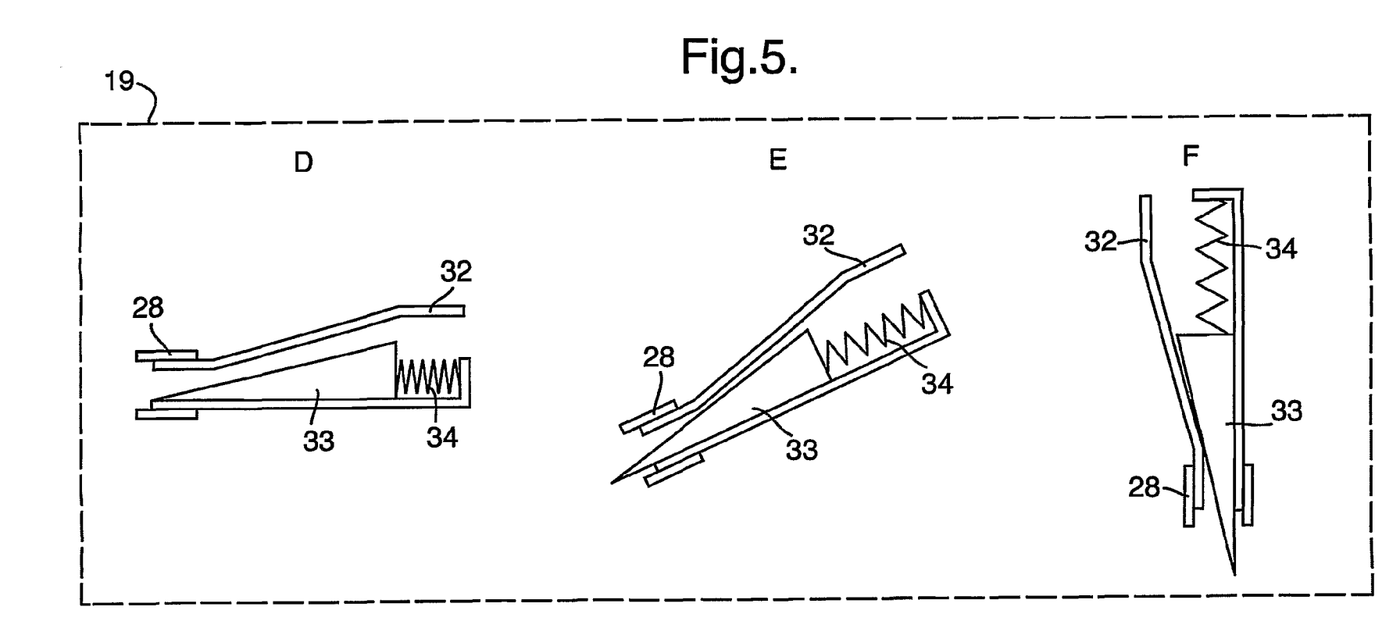
FIG. 5 is a schematic representation of another preferred embodiment of the angle detection valve.

An alternative embodiment to the ball valve to detect angles is a needle valve angle detection as shown in FIG. 5. Instead of ball bearings there is provided a needle valve wedge 33 and a retaining spring 34. The needle valve is weighted so that it cannot be pushed away from the inflow by the pressure in the line 28, and the spring is set to give the appropriate expansion length to allow the wedge to obstruct the inflow completely, only, in the vertical position. Similar to the ball valve, as the angle of the angle detection valve changes from the horizontal (D) to vertical position (F) the resolved weight of the needle 33 extends the spring 34 to reduce the size of the inflow orifice. The smaller orifice means a greater pressure build up in the line 28 which is proportional to the angle (E).

Figure 4:
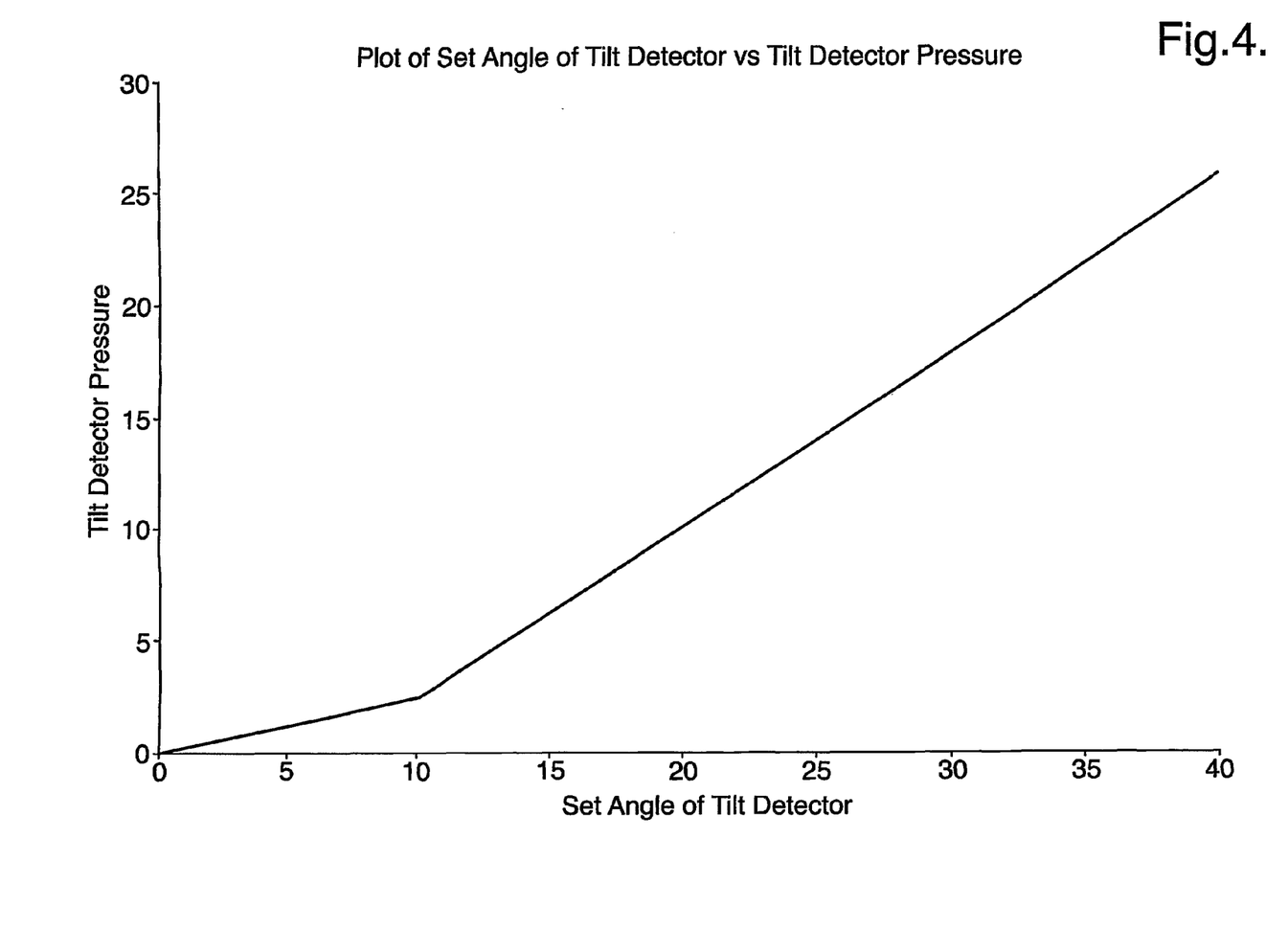
FIG. 4 shows the results of the pressure against angular position of the angle detection valve.

The angle detection valves can be calibrated to provide an accurate angle measurement based on the angle detection line pressure. FIG. 4 shows the results of angle pressure against angular position of the angle detection valve.

Figure 6:
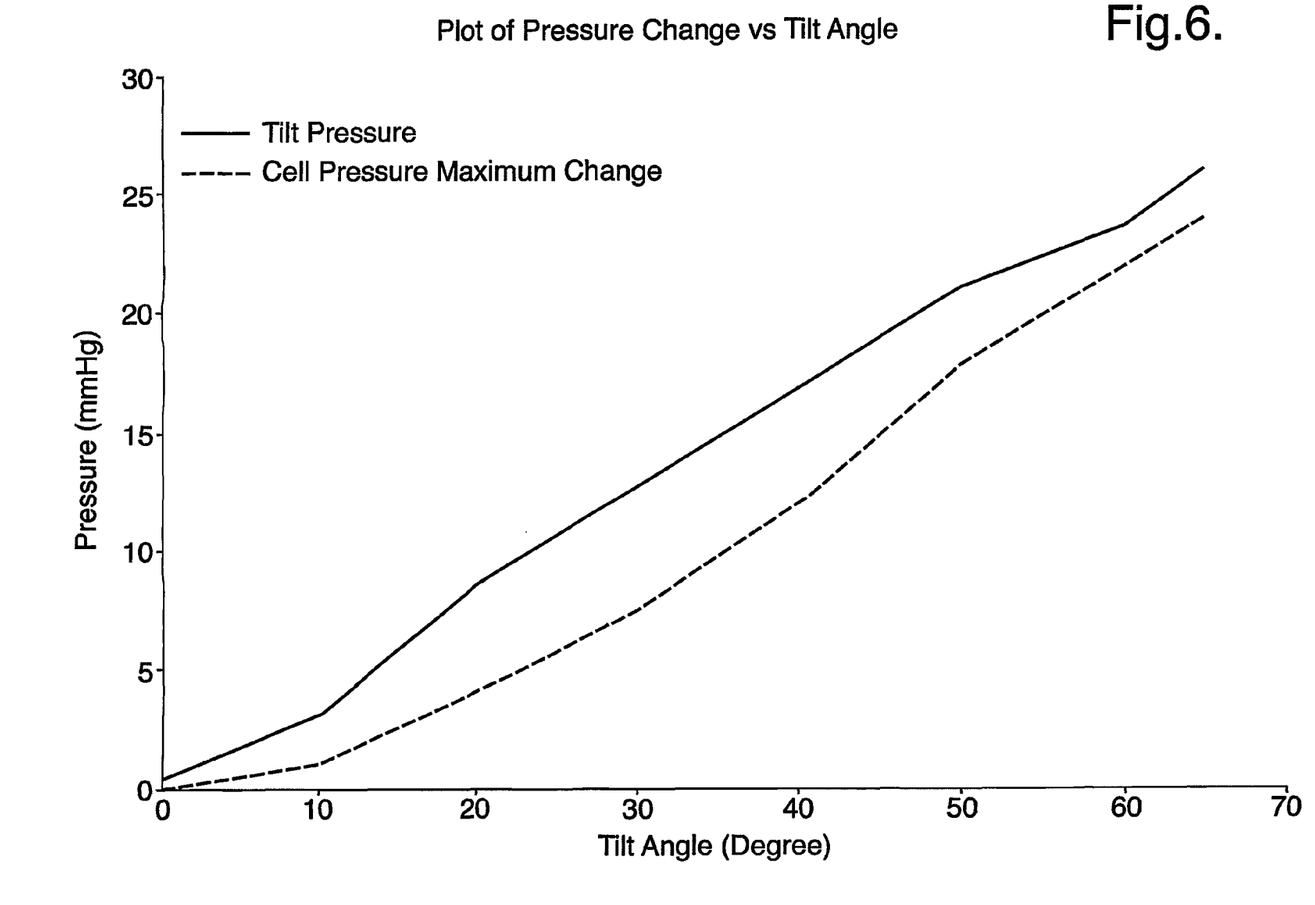
FIG. 6 shows the pressure values in the detection line and the cell pressures with the angular position of the angle detection valve.

FIG. 6 plots the rise in detection line pressures and cell pressures with the angular position of the angle detection valve.

Figure 7:
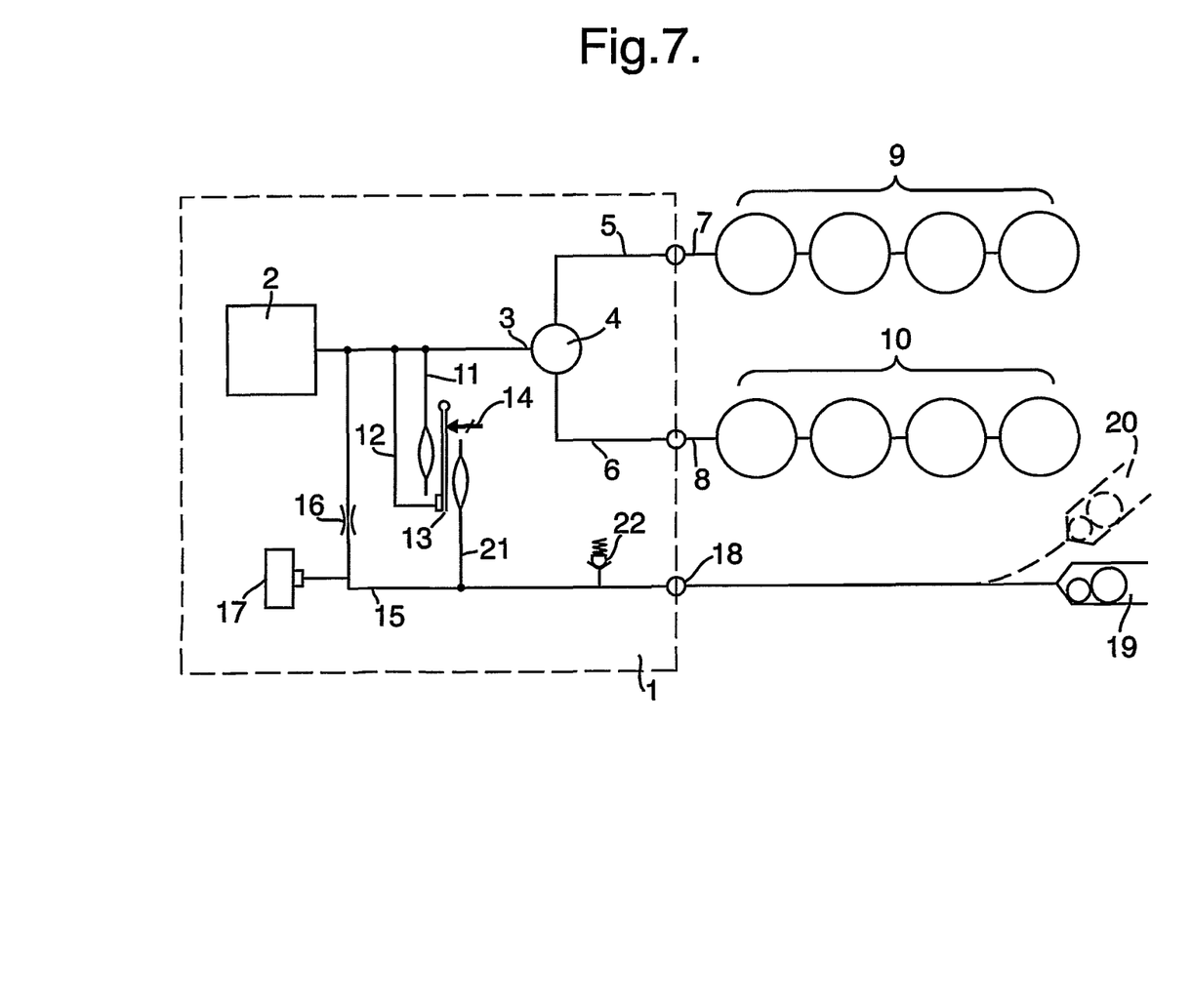
FIG. 7 is a schematic representation of a pressure controller in an alternating pressure pad system with an additional pressure regulator.

A further embodiment of the present invention is shown in FIG. 7. In this Figure like reference numerals represent like features as in FIG. 1. It may be desirable to limit the increase in cell pressures so that at very steep angles (>50°) the pressure is not too high. In this embodiment, pressure regulator 22 is introduced into the angle detection line 15 between the restrictor 16 and the angle detection valve 19. This regulator limits the maximum pressure in the angle detection line 15 and inflatable member 21, and therefore limits the maximum cell pressure increase, as shown in FIG. 8.

Figure 8:
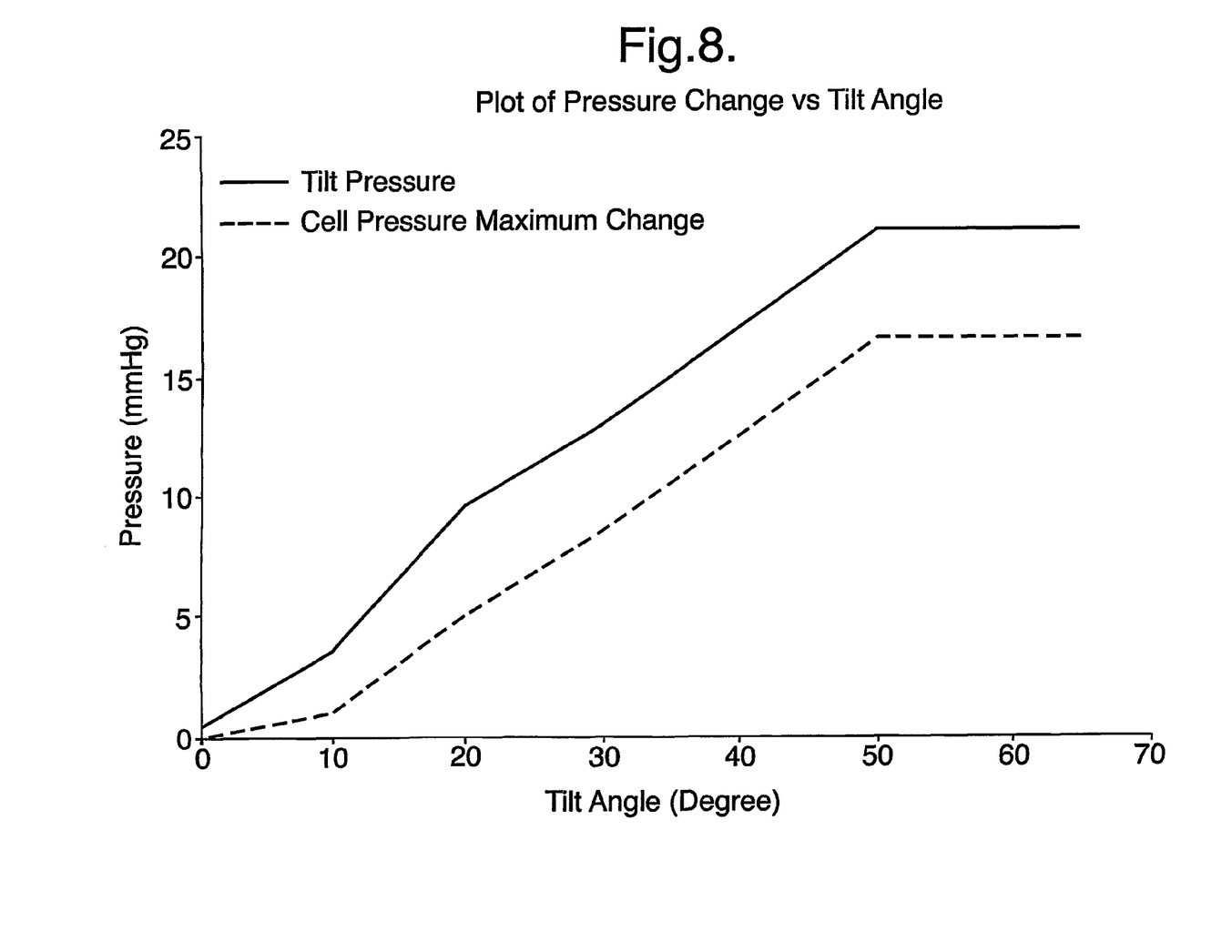
FIG. 8 shows the pressure values in the detection line and the cell pressures with the angular position of the angle detection valve, limited to a maximum cell pressure increase.

In FIG. 8 it can be seen that the angle detection line pressure rises until it reaches 20 mmHg at 50°, after this the pressure remains constant even though the angular position of the detection valve is increasing.

Figure 9A:
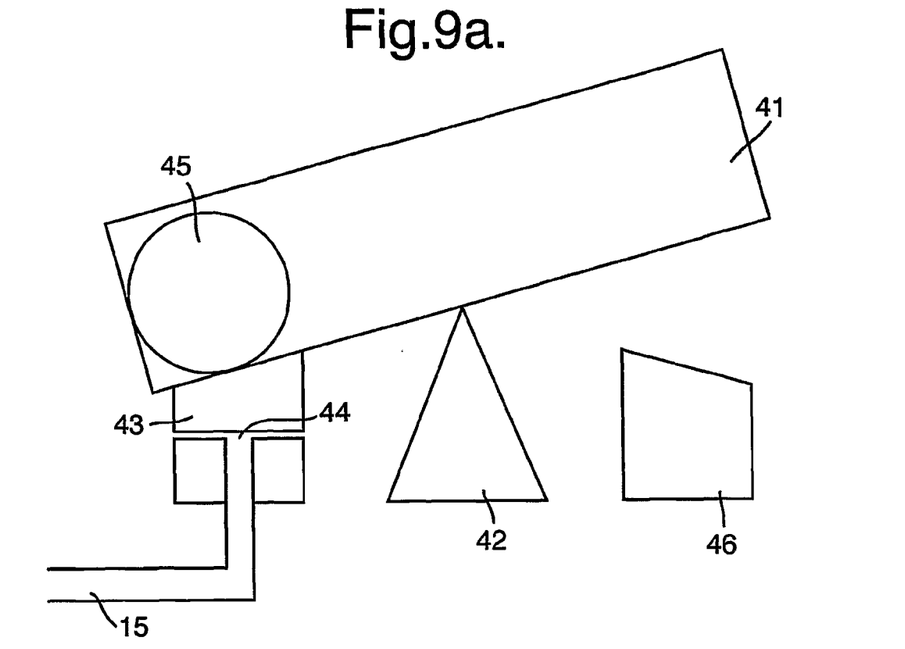
FIGS. 9a and 9b are schematic representations of a further embodiment of an angle detection valve.
Figure 9B:
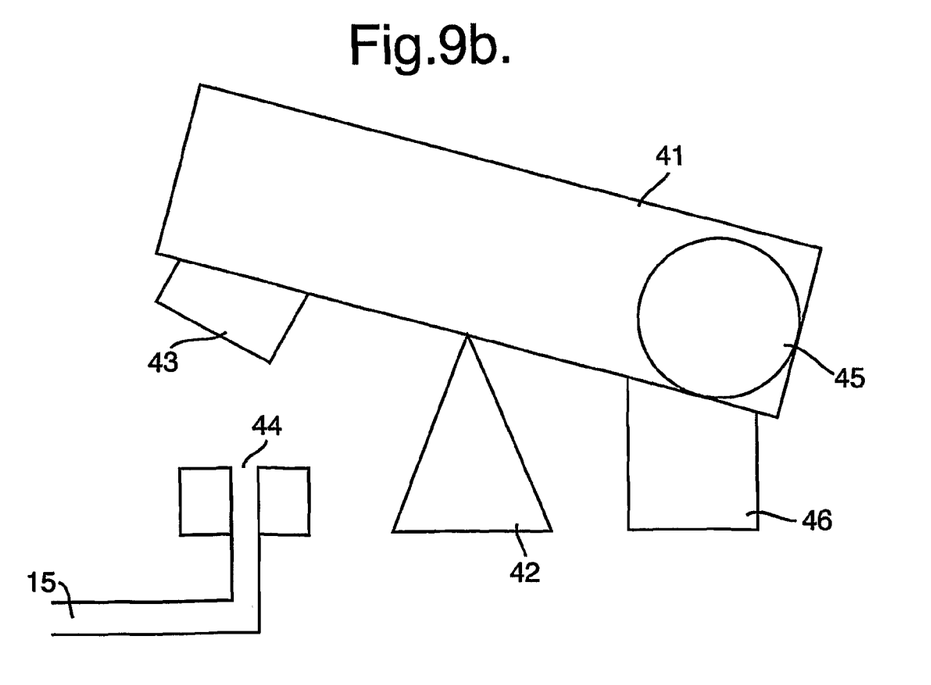

Another embodiment of the present invention is shown in FIG. 9 where it may be desirable to only start inflating the cells once a certain angle has been achieved in order to keep the preferable therapy of lower cell pressures until a profiling angle is achieved where bottoming is likely to occur. In this embodiment, a simpler angle detector is used comprising essentially a binary switch arrangement which will show if the valve is in or beyond a predetermined angular position or not. The angular position detected is determined by the orientation of the angle detection valve initially upon installation. The angle detection valve cannot determine any angular position but simply whether the valve is in or beyond a predetermined angular position.

As shown in FIG. 9, the valve consists of a housing 40 containing a hollow tube 41 which mounted in a "see saw" fashion with the pivot 42 in the middle of the housing. At one end of the hollow tube 41, on the underside, is a sealing pad 43 which seals an aperture 44 in the housing 41 when the tube 41 is moved to an angular position from the horizontal in one direction. When the tube 41 is moved to an angular position in the other direction, the aperture 44 is open. A pad 46 at the other end dampens noise.

Inside the hollow tube 41, a ball bearing 45 provides additional weight and momentum for the see-saw arrangement. For example, when the tube 41 is moved so that the sealing pad 43 seals the aperture 44, the ball bearing 45 provides additional weight to ensure a tight seal. When the valve is moved into a predetermined angular position the ball bearing provides the momentum to ensure that the valve switches state cleanly.

Rubber pads at each end of the see saw tube 41 reduce the sound of the ball bearing 45 hitting the tube ends.

Figure 10:
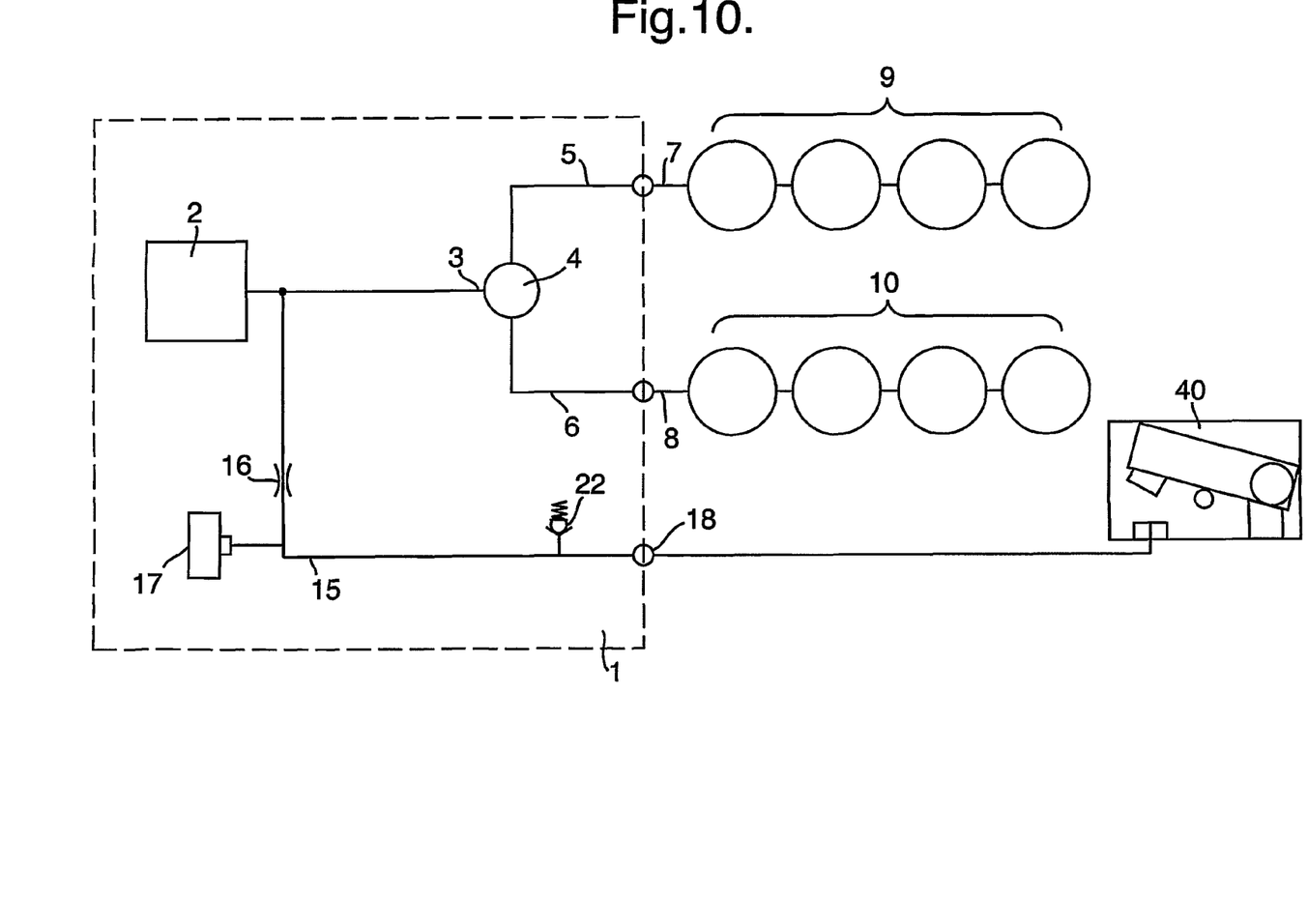
FIG. 10 is a schematic representation of a pressure controller in an alternating pressure pad system incorporating the angle detection valve of FIG. 9.

FIG. 10 shows the angle detection valve 40 within an alternating system as shown in FIG. 1. In this Figure like reference numerals represent like features as in FIG. 1.

In use, air is supplied from the compressor 2 to cells 9 and 10 and also through a restrictor 16 to detection line 15 to pressure transducer 17 and the angle detection valve 40. The pressure transducer 17 detects the pressure in the detection line 15.

When the angle detection valve 40 is below the predetermined angle the see saw tube 41 is as shown in FIG. 9b and the air in the angle detection valve is free to pass through the valve and out to atmosphere so there is no back pressure in the detection line 15. As the angle detection valve is tilted beyond the predetermined angle, the see saw tube 41 swings the other way, as shown in FIG. 9a. The air flow is now restricted in the detection line 15 creating a back pressure in the circuit. The pressure detected by the pressure transducer 17 jumps from below 2 mmhg (typically) to over 8 mmHg, and provides a binary signal for the controller.

The pressure controller 2 uses the pressure transducer to detect this change in pressure and then acts to adjust compressor output to the cells 9, 10 accordingly.

The movement of the ball bearing 45 is not in the same plane as the movement of the sealing pad 43, thus any small movement of the ball bearing will have minimum impact on the quality of the seal. The controlling software will "debounce" any remaining glitches in the signal.

The system works for pressures between 22 mmHg to 64 mmHg with up to 160 Kg on the cells in this system implementation.

Figure 11:
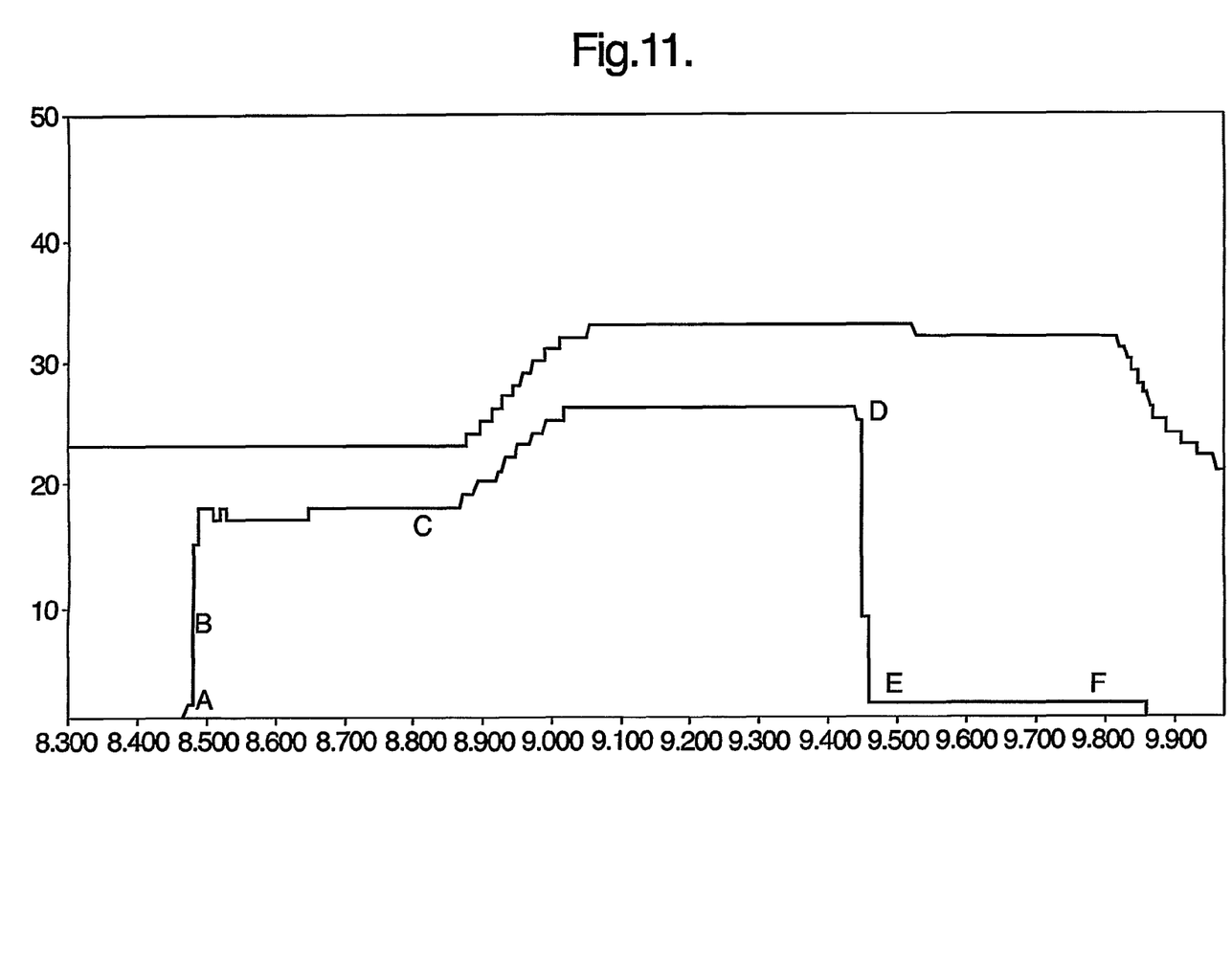
FIGS. 11, 12, and 13 show the pressure values in the detection line and the cell pressures at different cell pressures, all limited to a cell pressure increase only above a certain angular position of the angle detection valve.
Figure 12:
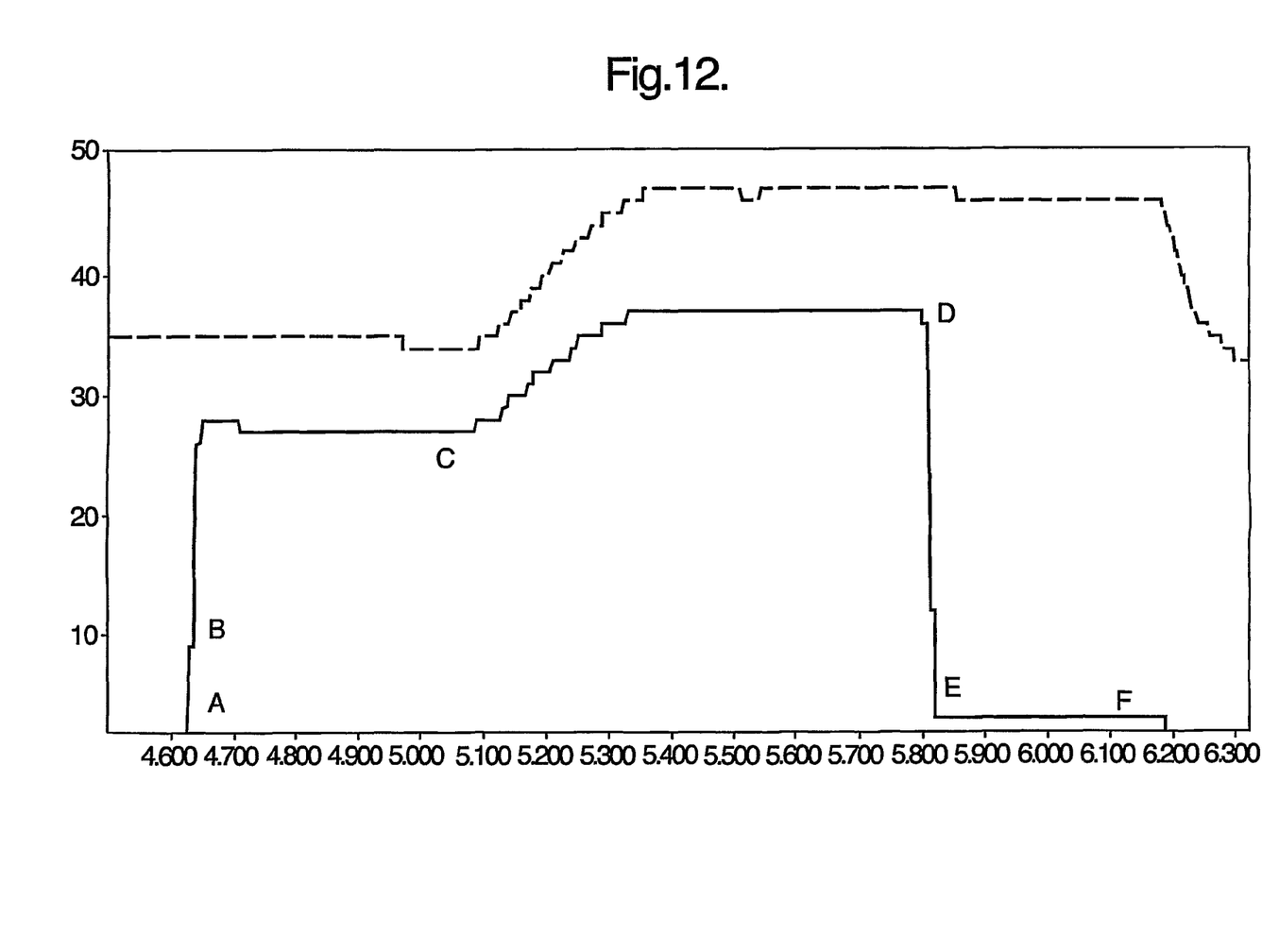
Figure 13:
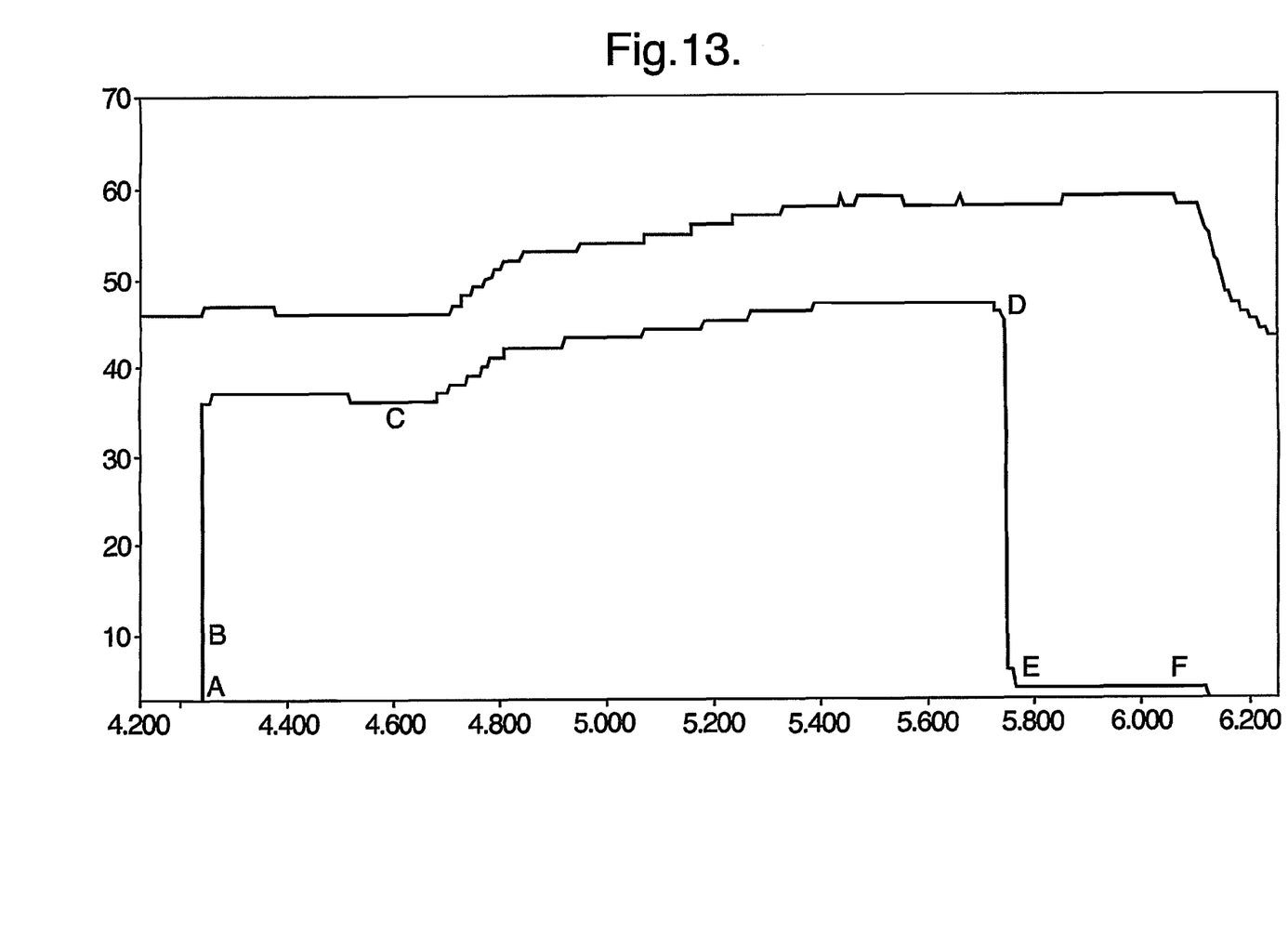

The sequence of events is shown again in the pressure plots in FIGS. 11, 12 and 13. Each plot shows the sequence at a different target cell pressure. At point A the angle detection valve see saw tube 41 swings over to the state where the aperture 44 is sealed. The pressure in the detection line 15 rises rapidly. After the pressure in the detection line 15 has been stable for a while the target pressure for the cells is adjusted accordingly (point C). At point D the cells 9 and 10 are lowered and the angle detection valve see saw tube 41 swings away from the aperture and allows air flow through the valve. The pressure in the detection line 15 falls rapidly. After the pressure in the detection line has been stable for a while the target pressure of the cells is adjusted accordingly (point F). This achieves a "gentle transition" in system pressures for the patient on the mattress. The three plots show that the binary switching action is achieved across a wide range of pressures an.

Previous attempts at angle detection valves have resulted in devices that have "dead bands". These occur when the device is tilted at an angle such that it ether does not register a change when it should or it changes state too quickly, bouncing between the two states. The ball bearing 45 in the hollow tube 41 eliminates these dead bands by forcing the See Saw to move quickly to either of its two states and keeping it there.

The pressure controller can also show graphically on a screen when the cells have been raised almost immediately after an angular position of the valve is detected, but the pressure in the cells are adjusted only after their angular position has remained stable for a while.

The invention claimed is:

1. A pressure control system for an inflatable patient support, the system including:
   a. an inflatable cell tiltable to different angular orientations;
   b. an angle detection valve mounted to tilt with the inflatable cell, the angle detection valve having:
      (1) a valve input end into which fluid is supplied;
      (2) a valve output end from which the fluid exits;
      (3) a valve element configured to move via the force of gravity from:
         i. a non-obstructing position wherein the valve element allows the fluid to flow through the valve output end, to
         ii. an obstructing position wherein the valve element at least substantially blocks the fluid from flowing through the valve output end,
      when the angle detection valve's angular orientation is changed from a first angle to a second angle;
   c. a pressure transducer configured to obtain pressure measurements dependent on the fluid pressure at the valve input end, wherein the fluid pressure in the inflatable cell is adjusted in response to the pressure measurements.

2. The pressure control system of claim 1 wherein the inflatable cell defines at least a portion of a head section of an inflatable patient bed.

3. The pressure control system of claim 1 wherein:
   a. the angle detection valve also has a valve body having a body passage extending between the valve input end and the valve output end,
   b. the valve element lacks any attachment to the valve body, whereby the valve element is movable within the body passage when the angle detection valve's angular orientation is changed.

4. The pressure control system of claim 1 wherein the valve element includes a ball, wherein the ball moves adjacent one of the valve input end and the valve output end when the valve element moves into the obstructing position.

5. The pressure control system of claim 4 wherein the ball moves within a body passage defined within the valve element.

6. The pressure control system of claim 4 wherein:
   a. the valve element is pivotably mounted with respect to the valve output end to pivot between the obstructing and non-obstructing positions, and
   b. the ball is movable along a path defined within or adjacent to the valve element, such that when the angle detection valve's angular orientation is changed from the first angle to the second angle, the ball moves along the path to actuate pivoting of the valve element.

7. The pressure control system of claim 1:
   a. further including a valve body having a body passage extending between the valve input end and the valve output end, the body passage including a converging portion defined therein which decreases in diameter as the body passage extends toward one of the valve input end and the valve output end;
   b. wherein the valve element is configured to at least substantially complementarily fit within the converging portion of the body passage when the valve element is in the obstructing position.

8. The pressure control system of claim 1 wherein the valve element includes a wedge.

9. The pressure control system of claim 1 wherein the valve element includes a spring extending between the valve element and a wall situated between the valve input end and the valve output end.

10. The pressure control system of claim 1 further including a pump supplying fluid to the inflatable cell and to the valve input end, wherein:
    a. fluid supplied to the inflatable cell is not also supplied to the valve input end, and
    b. fluid supplied to the valve input end is not also supplied to the inflatable cell.

11. A pressure control system for an inflatable patient support, the system including:
    a. an inflatable cell,
    b. an angle detection valve having:
       (1) a valve input end into which fluid is supplied;
       (2) a valve output end from which the fluid exits;
       (3) a valve element configured to move via the force of gravity from:
          i. a non-obstructing position wherein the valve element allows the fluid to flow through the valve output end, to
          ii. an obstructing position wherein the valve element at least substantially blocks the fluid from flowing through the valve output end,
       when the angle detection valve's angular orientation is changed from a first angle to a second angle;
    c. a pump supplying fluid to the inflatable cell and to the valve input end, wherein:
       (1) fluid supplied to the inflatable cell is not also supplied to the valve input end, and
       (2) fluid supplied to the valve input end is not also supplied to the inflatable cell.

12. The pressure control system of claim 11 further including:
    a. a supply line supplying fluid from the pump to the inflatable cell,
    b. a supply line valve situated between the pump and the inflatable cell, wherein the supply line valve is configured to adjust the fluid pressure between the pump and the inflatable cell in response to the angle detection valve's angular orientation.

13. The pressure control system of claim 11 wherein the inflatable cell defines at least a portion of a head section of an inflatable patient bed.

14. The pressure control system of claim 11:
    a. wherein the inflatable cell is:
       (1) tiltable to different angular orientations, and
       (2) wherein the angle detection valve is mounted to tilt with the inflatable cell;
    b. further including a pressure transducer configured to obtain pressure measurements dependent on the fluid pressure at the valve input end, wherein the fluid pressure in the inflatable cell is adjusted in response to the pressure measurements.

15. The pressure control system of claim 11 wherein the valve element includes a spring extending between the valve element and a wall situated between the valve input end and the valve output end.

16. A pressure control system for an inflatable patient support, the system including an angle detection valve having:
    a. a valve input end into which fluid is supplied,
    b. a valve output end from which the fluid exits,
    c. a valve body having a body passage extending between the valve input end and the valve output end, the body passage including a converging portion defined therein which decreases in diameter as the body passage extends toward one of the valve input end and the valve output end,
    b. a valve element configured to move within the body passage via the force of gravity from:
       (1) a non-obstructing position wherein the valve element allows the fluid to flow through the valve output end, to
       (2) an obstructing position wherein the valve element at least substantially blocks the fluid from flowing through the valve output end,
    when the angle detection valve's angular orientation is changed from a first angle to a second angle.

17. The pressure control system of claim 16 wherein the valve element is configured to at least substantially complementarily fit within the converging portion of the body passage when the valve element is in the obstructing position.

18. The pressure control system of claim 17 wherein the valve element includes a ball.

19. The pressure control system of claim 17 wherein the valve element includes a wedge.

20. The pressure control system of claim 17 wherein the valve element includes a spring extending between the valve element and a wall bounding the body passage.

21. The pressure control system of claim 16 further including:
 a. a first inflatable cell:
  (1) tiltable to different angular orientations, and
  (2) wherein the angle detection valve is mounted to tilt with the inflatable cell;
 b. a pressure transducer configured to obtain pressure measurements dependent on the fluid pressure at the valve input end, wherein the fluid pressure in the inflatable cell is adjusted in response to the pressure measurements.

22. The pressure control system of claim 16 wherein the inflatable cell defines at least a portion of a head section of an inflatable patient bed.

23. A pressure control system for an inflatable patient support, the system including an angle detection valve having:
 a. a valve body having a body passage extending between a valve input end into which fluid is supplied and a valve output end from which the fluid exits, the body passage including a converging portion defined therein which decreases in diameter, and
 b. a valve element including a ball sized to engage the inner circumference of the converging portion, the valve element being configured to move via the force of gravity from:
  (1) a non-obstructing position wherein the valve element allows the fluid to flow through the valve output end, to
  (2) an obstructing position wherein:
   i. the ball moves adjacent one of the valve input end and the valve output end, and
   ii. the valve element at least substantially blocks the fluid from flowing through the valve output end,
  when the angle detection valve's angular orientation is changed from a first angle to a second angle.

24. The pressure control system of claim 23 further including:
 a. an inflatable cell:
  (1) tiltable to different angular orientations, and
  (2) wherein the angle detection valve is mounted to tilt with the inflatable cell;
 b. a pressure transducer configured to obtain pressure measurements dependent on the fluid pressure at the valve input end, wherein the fluid pressure in the inflatable cell is adjusted in response to the pressure measurements.

25. The pressure control system of claim 23 wherein the inflatable cell defines at least a portion of a head section of an inflatable patient bed.

* * * * *